W. P. BROWN.
COUPLINGS FOR CULTIVATORS.

No. 190,816. Patented May 15, 1877.

WITNESSES:

INVENTOR:
Wm. P. Brown
BY
ATTORNEYS.

UNITED STATES PATENT OFFICE.

WILLIAM P. BROWN, OF ZANESVILLE, OHIO.

IMPROVEMENT IN COUPLINGS FOR CULTIVATORS.

Specification forming part of Letters Patent No. 190,816, dated May 15, 1877; application filed April 6, 1877.

*To all whom it may concern:*

Be it known that I, WILLIAM P. BROWN, of Zanesville, in the county of Muskingum and State of Ohio, have invented a new and Improved Coupling for Cultivator; and I do hereby declare that the following is a full, clear, and exact description of the same, reference being had to the accompanying drawing, forming part of this specification, in which—

Figure 1:
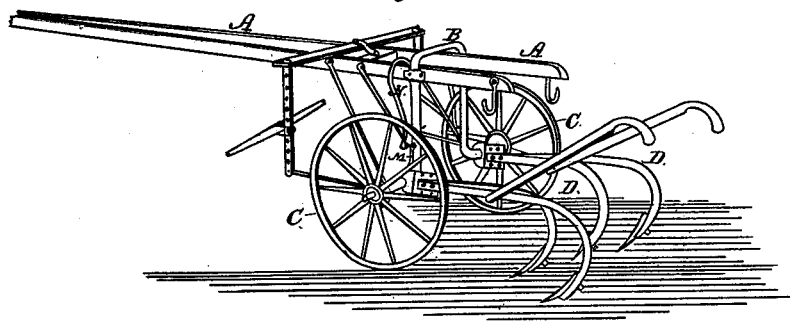
Figure 2:
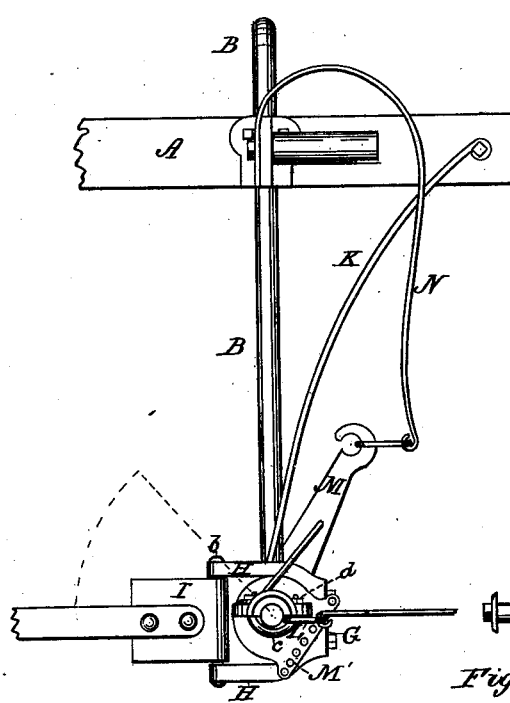
Figure 3:
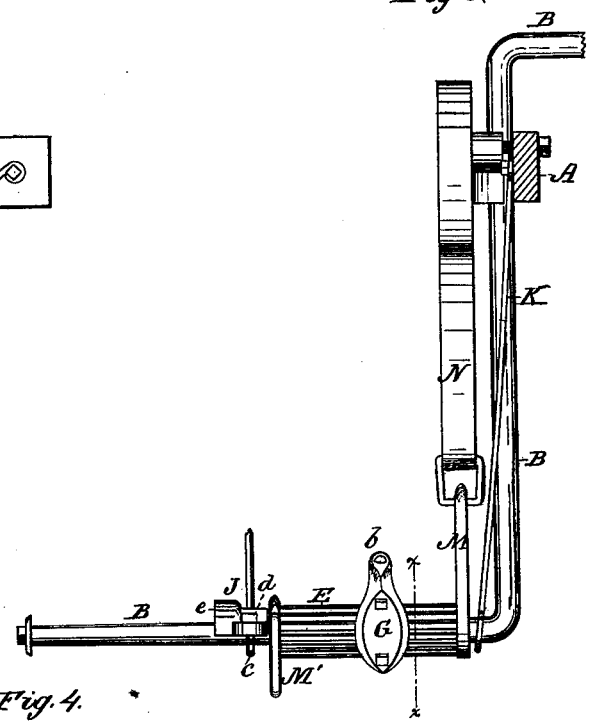
Figure 4:
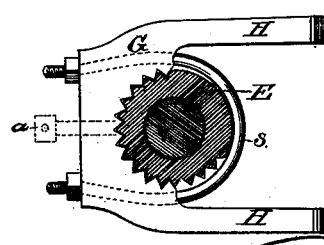

Figure 1 is a perspective view of the particular form of cultivator to which my coupling is to be applied. Fig. 2 is a side view of one of the couplings, looking in a line with the axle. Fig. 3 is a front view of one of the couplings, looking at right angles to the axle; Fig. 4, an enlarged transverse section through line $x\,x$, Fig. 3.

My invention relates to an improved form of coupling for fastening the forward ends of the beams of plows or gangs to the axle of a wheeled cultivator.

The improvement consists in the particular construction and arrangement of a tube or pipe-box turning loosely upon the horizontal ends of the crank-axle, and connected, through an adjustable stirrup or sleeve and bracket, with a head having a long bearing at right angles to the pipe-box, to which head the forward ends of the plow-beams are bolted, while the pipe-box is provided with means for turning it against the gravity of the attached cultivator in the rear, whereby the said cultivators are manipulated with greater ease, as hereinafter more fully described.

In the drawing, A represents the longitudinal bars, extended forward to form the tongue, and constituting the main frame of a wheeled cultivator, to which my invention is applied, which bars are arranged upon the elevated crank-axle B, supported upon wheels C. Upon the horizontal parts of said crank-axle, between the upright portions and the wheels, are arranged my couplings, which secure the beams of the plows or gangs D. These couplings are constructed as follows: E are tubes or pipe-boxes, which embrace the axle B and turn freely thereon. G is a stirrup, which is held to the pipe-box E by means of a loop, $s$, and is made to rigidly connect with said pipe-box by means of longitudinal ribs upon the stirrup, which engage with corresponding ribs upon the pipe-box. The stirrup, however, instead of having a loop, $s$, may be constructed in the form of a sleeve, and made to embrace pipe-box E, in which case it will be adjusted thereon by a screw-bolt, $a$, whose inner end may bear upon a roughened steel jib, which bites the pipe-box and prevents the sleeve from slipping. Said stirrup is formed with projecting lugs or brackets H, which are perforated to receive a pivot-bolt, $b$, arranged vertically and at right angles to the pipe-box. Around this bolt $b$ is arranged the head I, which is made with a long bearing, to which head the forward ends of the beam are bolted.

Referring to the feature of the pipe-box and adjustable sleeve, I would have it understood that I do not claim such, broadly, as the same idea is shown in Patent No. 108,945. J is a cap, fastened to the crank-axle, between the hub of the wheel and the pipe-box, by means of a staple, $c$, which binds around the axle, and is fastened to the cap by nuts $d$. This cap serves as a stop to the hub of the wheel, to separate the same from the pipe-box, and its curved and flanged end $e$ acts as a guard to keep dirt and other obstruction from the bearings of the wheel. K is a brace, designed to stay the axle to the tongue, and L is a link arranged in the staple of the cap J, to which the draft attachment is secured to properly distribute the strain upon the implement.

From the above description it will be seen that the gangs of cultivators have free and easy motion laterally, from right to left, on the long bearing of the vertical pivot-bolt, and also a free movement vertically upon the axle, (by reason of the pipe-box,) when it is desired to lift the cultivators, either to hang them upon the hooks of the frame, out of contact with the earth, or to raise them for any other purpose.

To render the manipulation of the plows or cultivators easy, I provide an arrangement whereby either springs, weights, or the draft-power may be utilized for sustaining a part of the weight of the said cultivators when they are lifted from the ground to be hung up or shifted laterally. In accomplishing this I construct the pipe-box with a hooked arm, M, and arrange a stiff spring, N, of metal or rubber, upon the main frame above, so as to engage, by means of a loop, with the end of the arm M, to rock the pipe-box; and as the cultivator-beam in the rear is rigidly attached to the pipe-box by the stirrup or the sleeve and its screw-bolt, the spring has the tendency to rock the pipe-box and assist the driver in lifting the cultivators.

I do not claim, broadly, the application of springs to sustain a part of the weight of the cultivator, as this is shown in my Patent No. 128,701, of 1872; but I do claim a pipe-box provided with an arm or projection adapted to rock the same, and, referring to this same feature, I do not limit myself to the use of a spring operating in connection with such projection, as the pipe-box may be provided with a perforated flanged projection, M', to which the draft attachment may be directly fastened, and so arranged as to utilize a part of the draft to produce the same lifting effect upon the cultivators when attached above the center of the pipe, and, when below the center, assists to make the plows run deeper, and when the plows are raised out of the soil or dirt the draft on projecting flange ceases, allowing the spring to assist in lifting the plows.

In the place of the flange mentioned, a counter-weight may be employed for the same purpose, or a sheave or pulley may be arranged on the pipe-box with a chain to produce the same effect.

In making use of my invention, the sleeve or stirrup and brackets can be adjusted to regulate the width between the duplicate cultivators by slackening the set-screw (if a sleeve be used) that binds the same to the pipe-box, or by disengaging the ribs and grooves of the pipe-box and stirrup, and moving said sleeve or stirrup, as desired. These ribs or the set-screw, it will be seen, hold the arm M in an upright position to allow the spring its proper tension, and by moving the set-screw and stirrup or sleeve the tension of the spring may be regulated as desired. The set-screw or its equivalent adjustment also serves to hold the sleeve or stirrup and brackets rigidly in place, to give the plows or cultivators a firm and steady upright position.

The length of the tube of the pipe-box gives a long bearing for raising and lowering the plows, and, while causing the latter to be held steady, affords also an easy motion, and one that cannot get cramped. The length of the pivot-bolt and distance between the brackets also permit the coupling-head I to be sufficiently deep to prevent the rocking or swaying motion of the plows when guided by the driver, and among other advantages may be mentioned the small degree of friction which is secured by the long bearings of the pipe-box and the head, and also the fact that its construction is such that its bolts cannot be made too tight, and hence there is no liability of its parts being wrongly adjusted by the unskilled.

With respect to counteracting the gravity of the cultivators or plows by means of the projecting flange or arm and the spring or its equivalent, it will be seen that it not only assists the plowman in operating the plows, and also in hanging them when not in use, but it acts as a counter-balance to the tongue, and thus relieves the neck of the team from the weight of the same. It also prevents the shovels from getting dull so rapidly, for, as the under side of said shovels do not press so hard upon the earth, the force of the earth is more nearly equalized above and below the point, and the shovel is evenly worn above and below. It also assists the shovels in scouring, as they are held more uniformly and with a more elastic pressure against the face of the soil, especially when the flange M' is used, which, when the draft is from the bottom of the same, causes the increased resistance to the shovels (which the hard places afford) to compel the draft to force the shovels deeper into said hard places, instead of skimming over the same.

Having thus described my invention, what I claim as new is—

1. The pipe-box provided with a projection adapted to co-operate with a spring, weight, or the draft, to rock the said pipe-box against or with the weight of the rear cultivators or plows, substantially as and for the purpose described.

2. The combination, with the crank-axle and the gangs or plows, of the pipe-box, having arm M, the spring N, attached to the main frame, the head I, and the stirrup G, or its equivalent, having brackets H and pivot-bolt b, and fastened to the pipe-box, substantially as and for the purpose described.

3. The pipe-box E, having longitudinal ribs, combined with the stirrup G, having corresponding grooves and a clamping device, substantially as described.

WILLIAM P. BROWN.

Witnesses:
 JNO. O'NEILL,
 F. S. GATES.